United States Patent Office 3,073,373
Patented Jan. 15, 1963

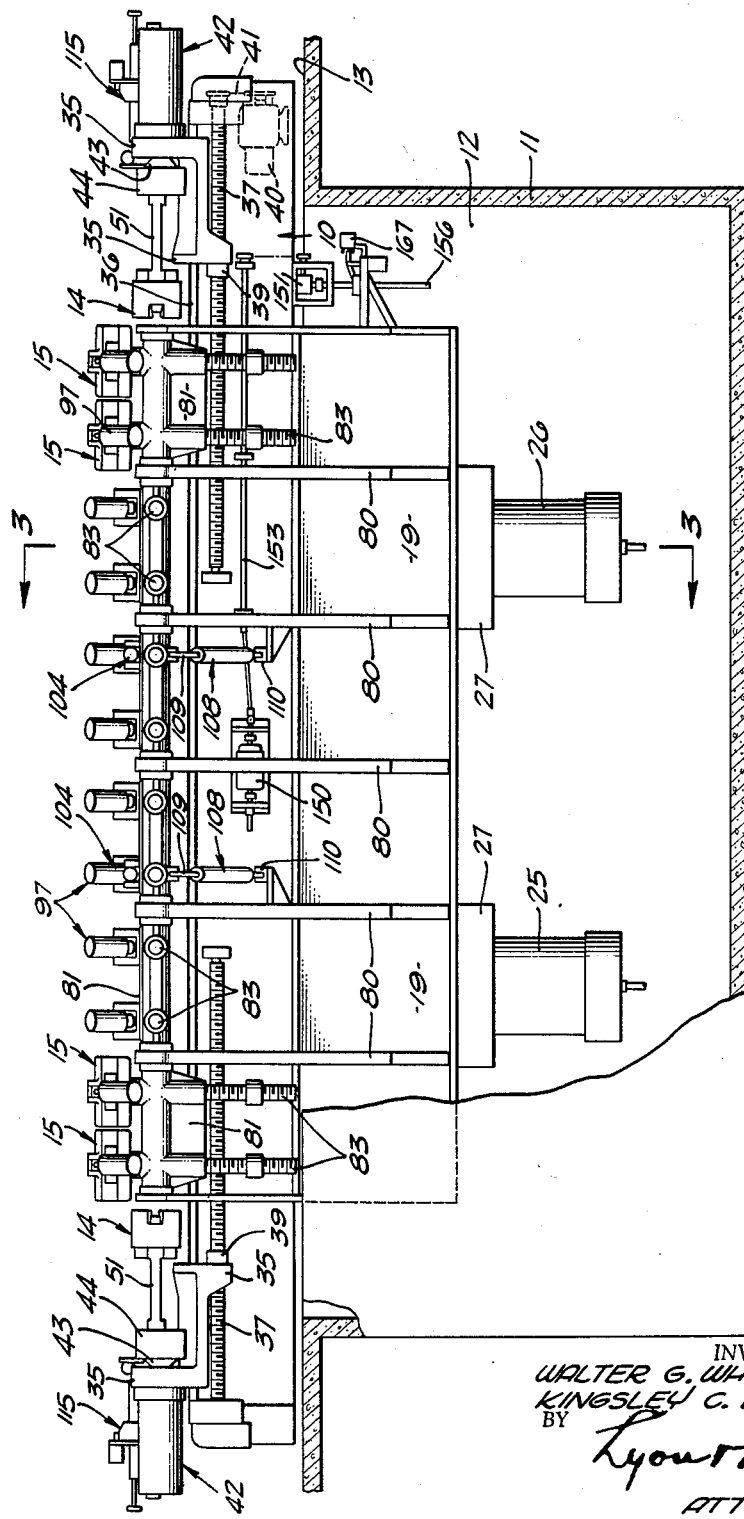

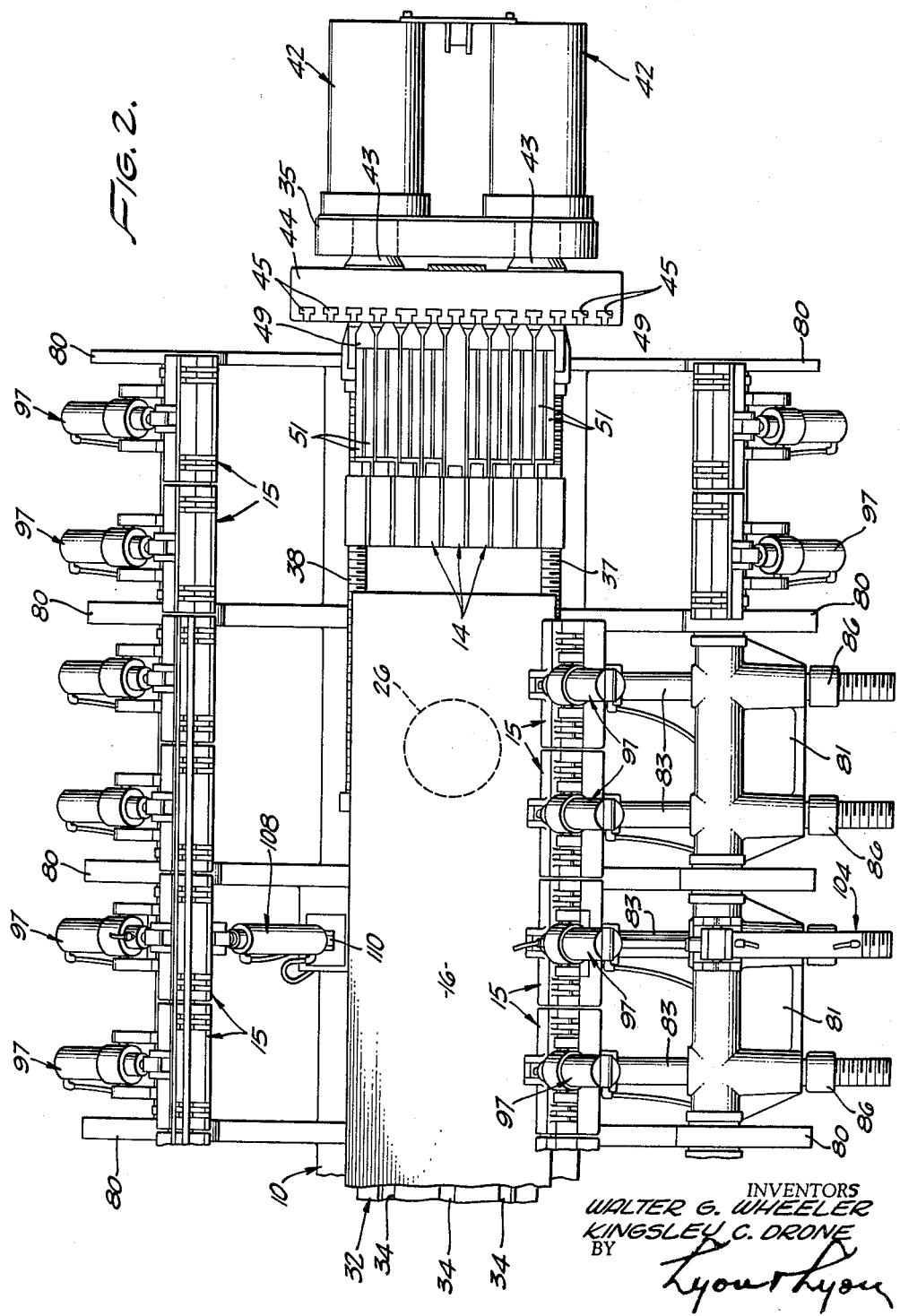

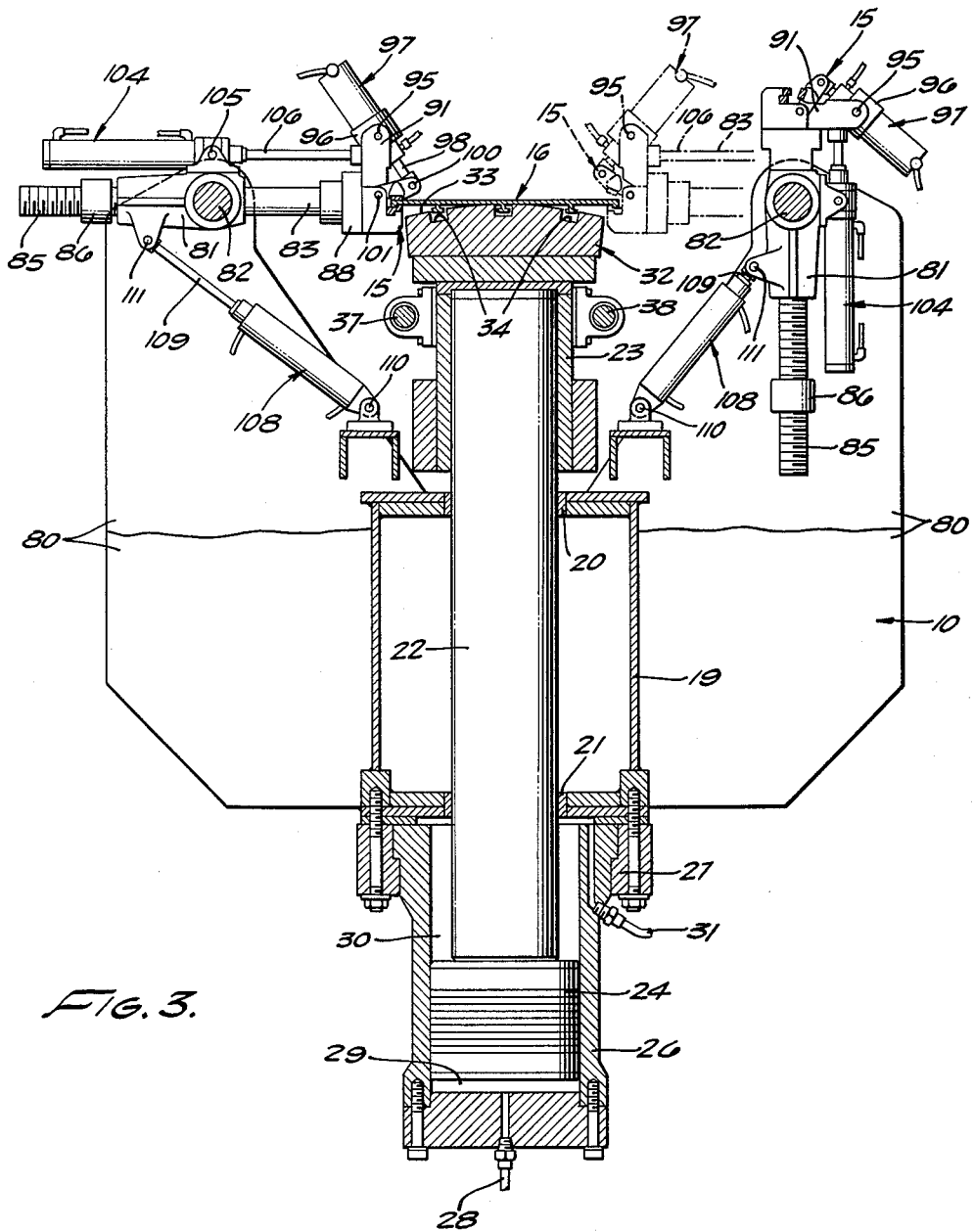

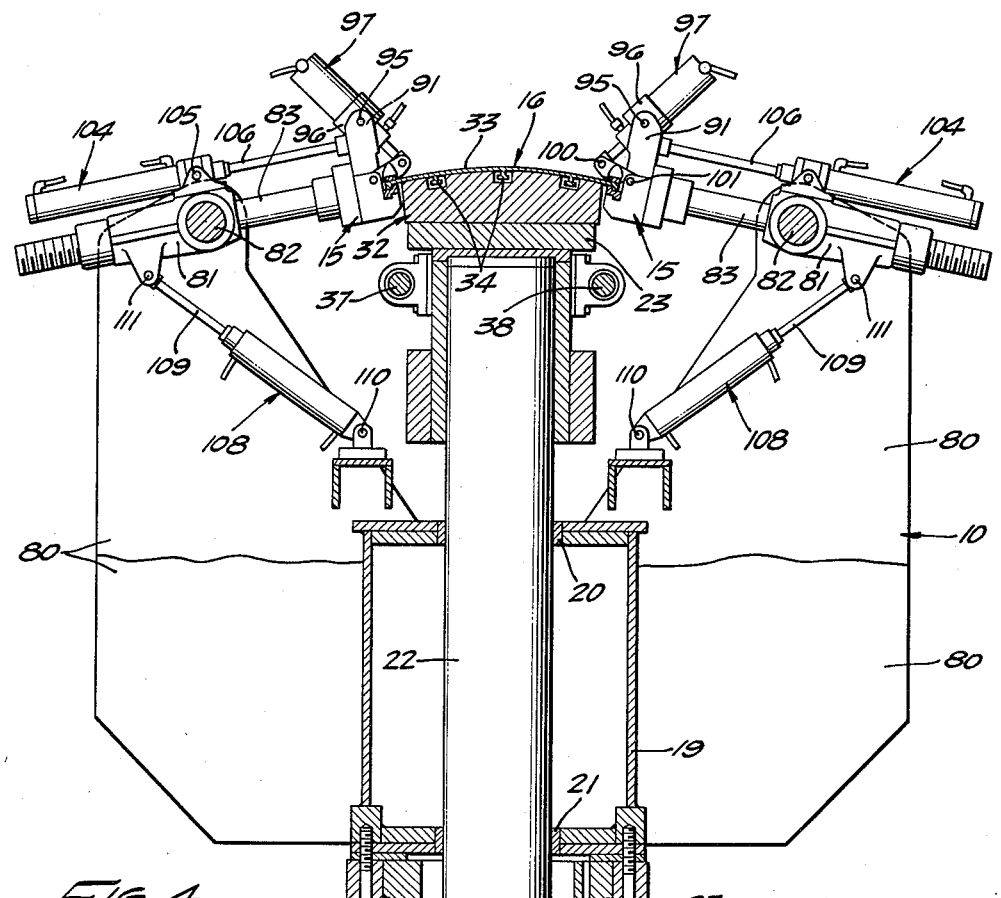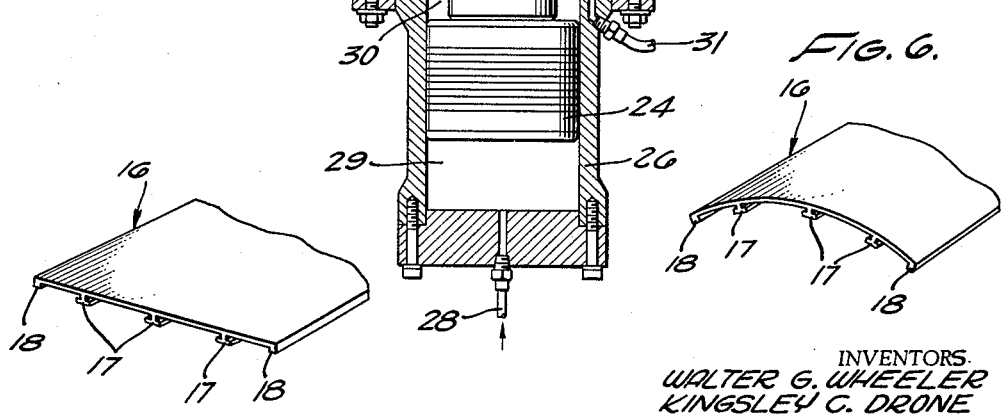

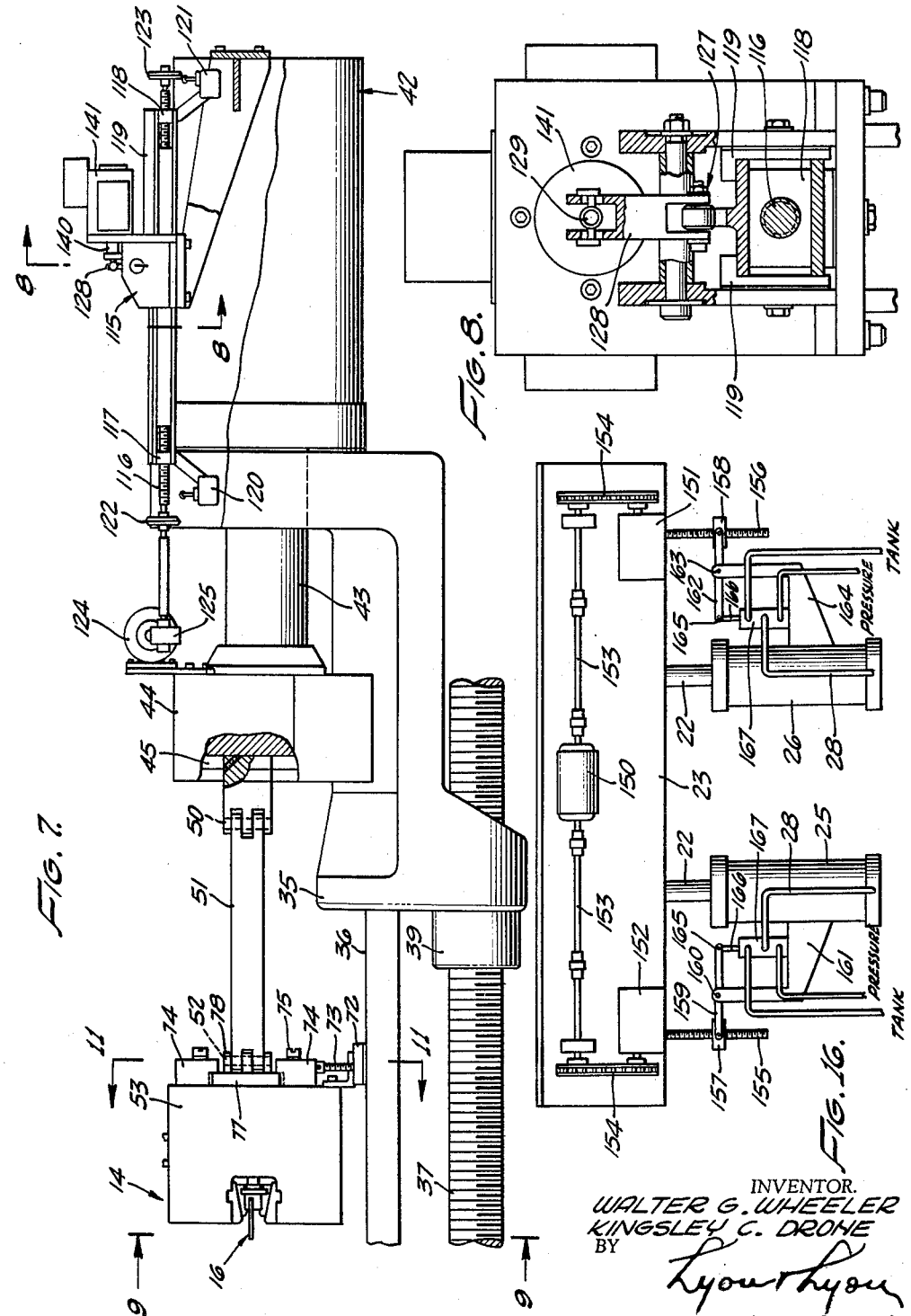

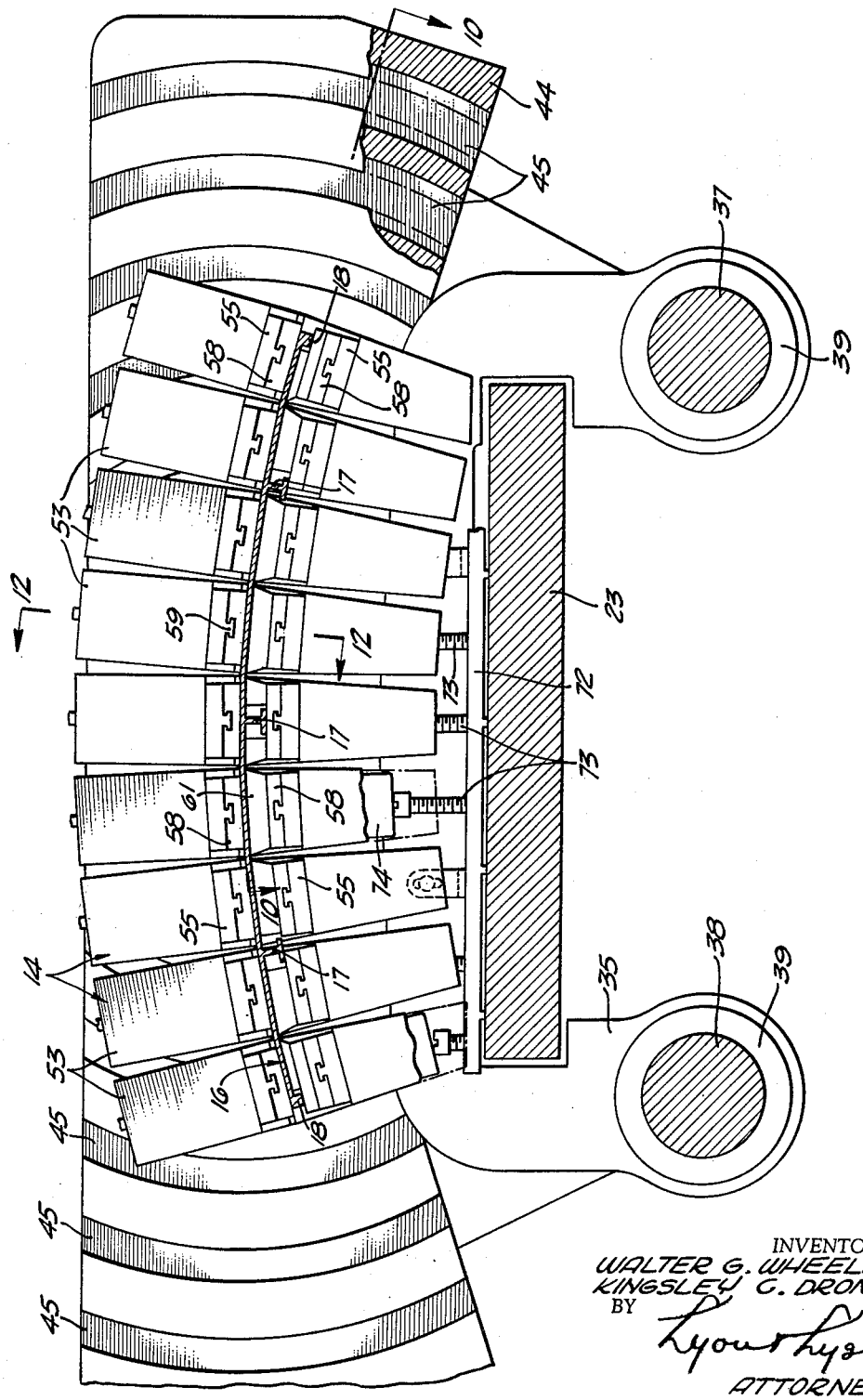

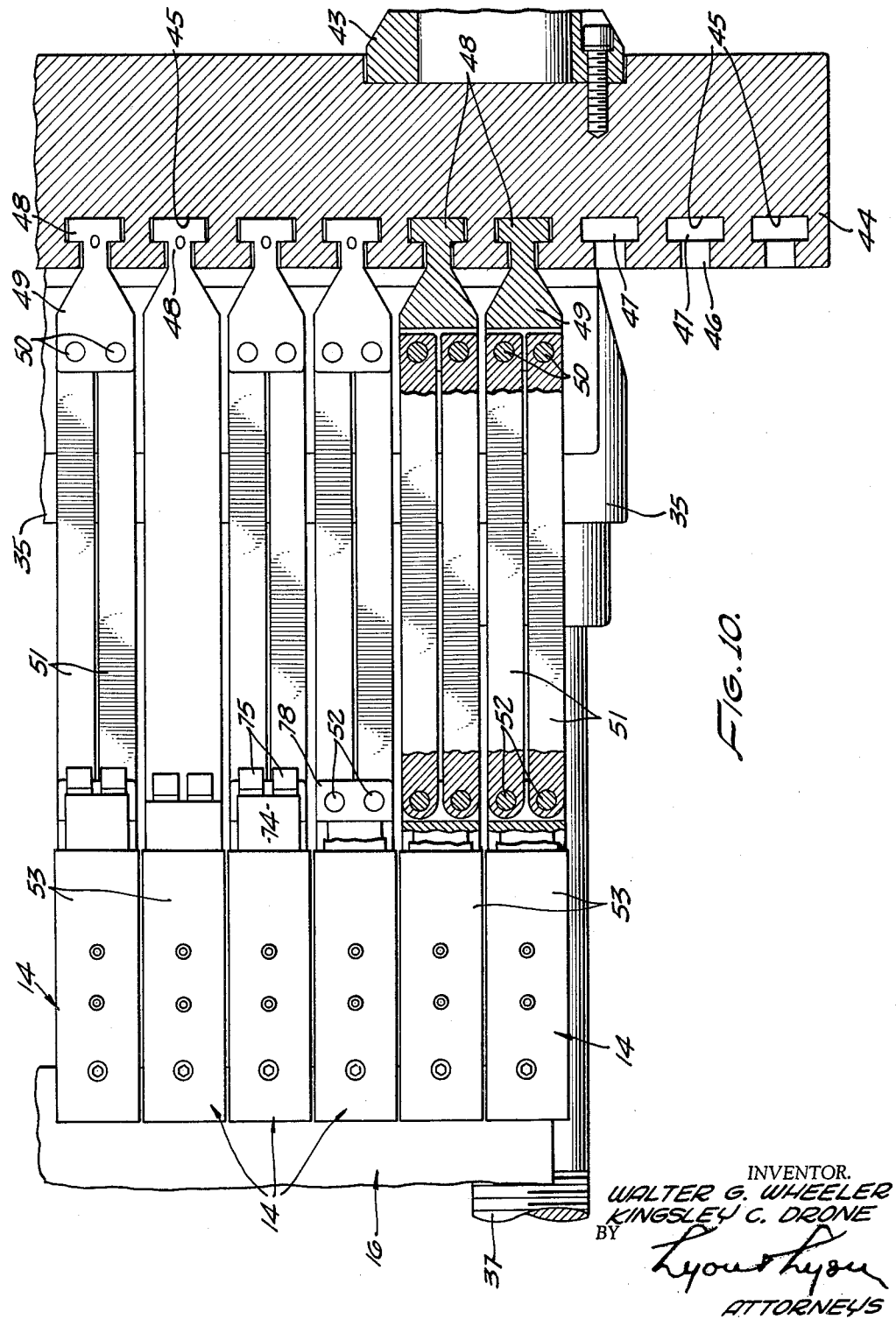

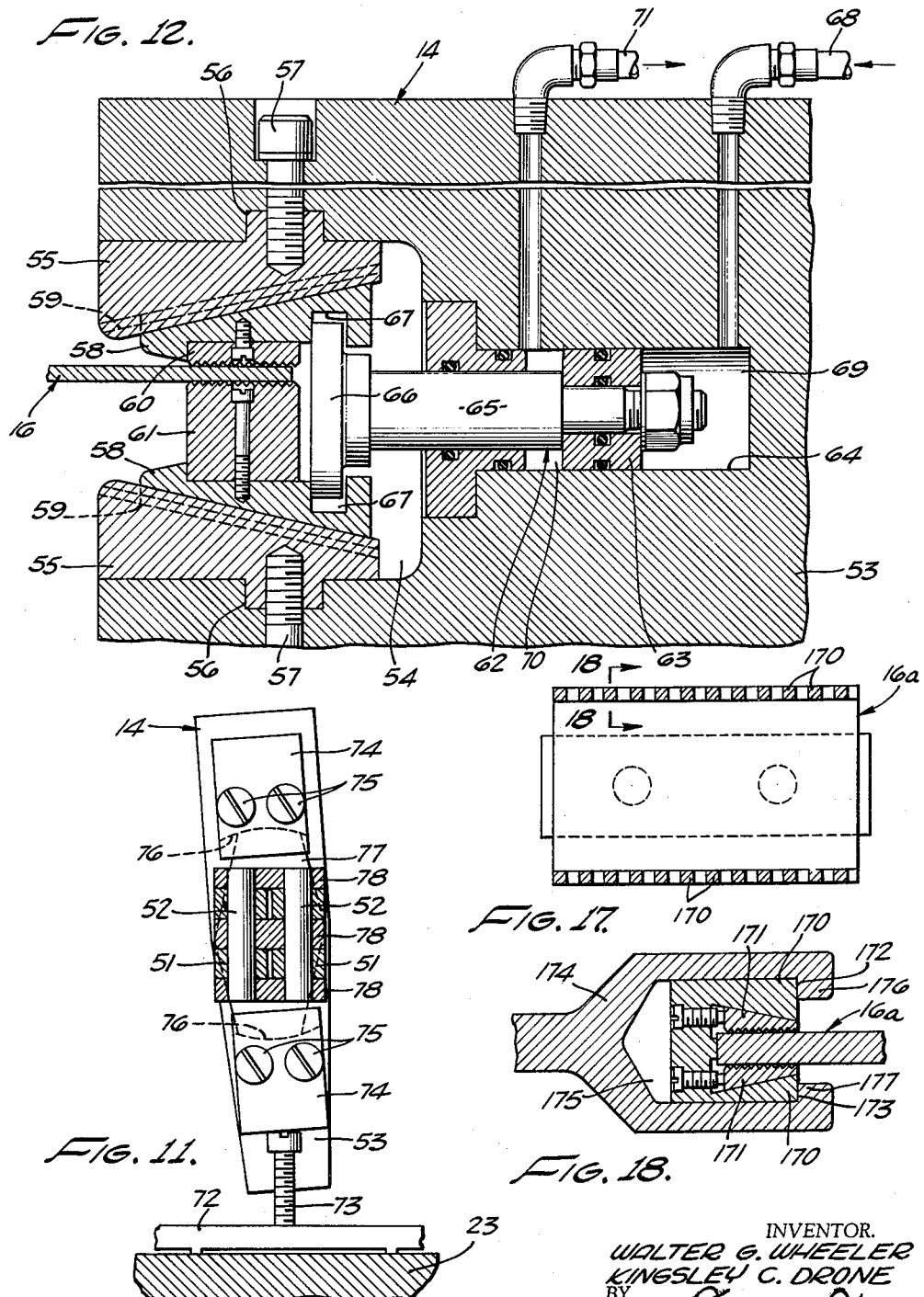

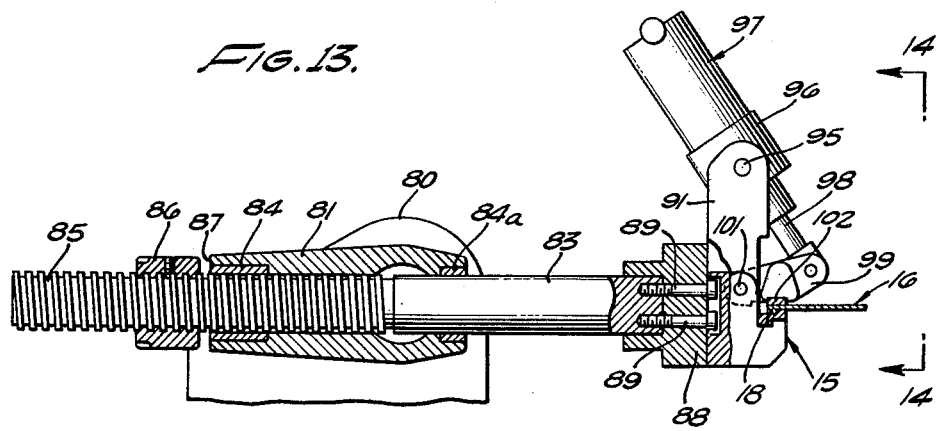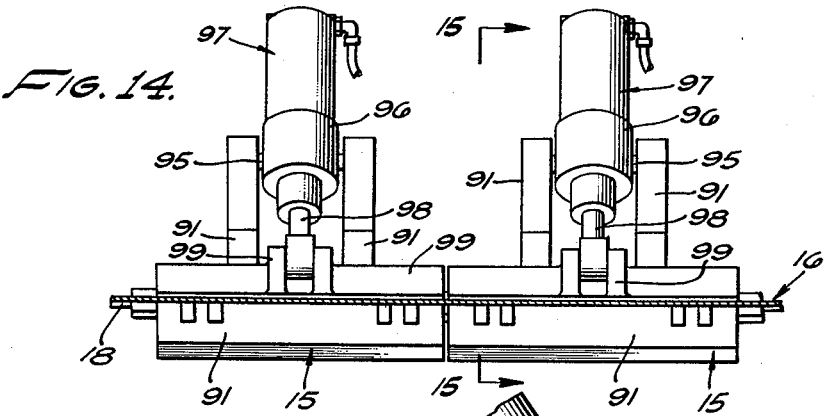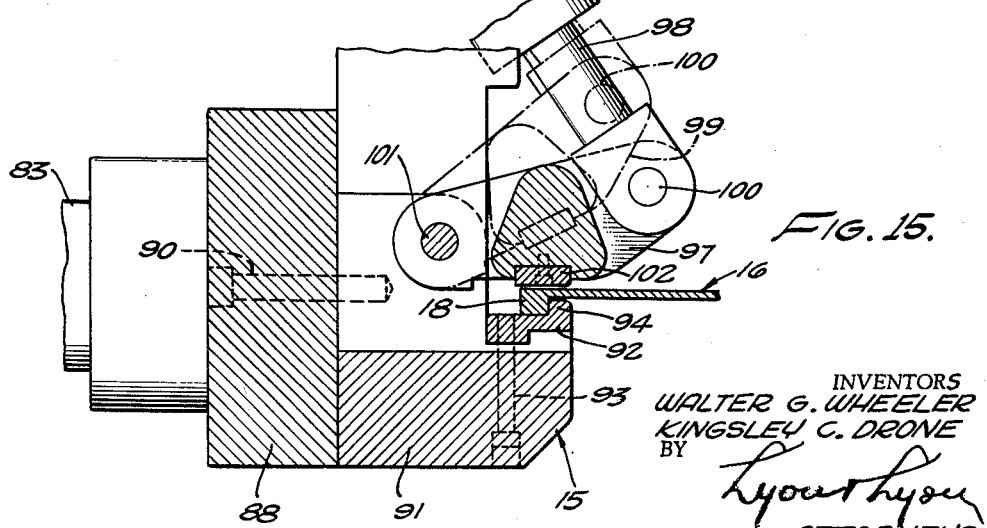

3,073,373
STRETCH FORMING APPARATUS
Walter G. Wheeler, Los Angeles, and Kingsley C. Drone, Manhattan Beach, Calif., assignors to The Hufford Corporation, El Segundo, Calif., a corporation of Delaware
Filed Oct. 14, 1957, Ser. No. 689,795
6 Claims. (Cl. 153—48)

This invention relates to the art of metal forming and is particularly directed to improvements in the method and apparatus for stretch wrap forming of metal sheets and the like.

It is an important object of this invention to provide a method and apparatus for stretching a sheet biaxially by restraining the side edges thereof while the sheet is stretched longitudinally. Another object is to provide method and apparatus for stretch wrap forming of an integrally stiffened skin. Another object is to provide a stretch wrap forming method and apparatus wherein a forming die in contact with the surface of the sheet imparts curvature to the sheet by virtue of simultaneous application to the sheet of longitudinal and transverse stresses. Another object is to provide a stretch wrap forming device having opposed pairs of sheet gripper assemblies together with means for moving the gripper assemblies in opposite directions at equal rates of movement with respect to a stationary frame. Other and more detailed objects and advantages will appear hereinafter.

In the drawings:

FIGURE 1 is a side elevation partly broken away, showing a preferred embodiment of our invention and illustrating one form of apparatus for carrying out our improved method.

FIGURE 2 is a plan view partly broken away.

FIGURE 3 is a sectional elevation taken substantially on the lines 3—3 as shown in FIGURE 1, the parts being shown in position prior to forming the work member or sheet.

FIGURE 4 is a sectional elevation similar to FIGURE 3 showing the parts in final position at the end of the forming operation.

FIGURE 5 is a perspective view in diagrammatic form, showing the work member before the forming operation.

FIGURE 6 is a view similar to FIGURE 5 showing the work member after the forming operation.

FIGURE 7 is a side elevation partly in section, showing the sheet gripping and tensioning apparatus at one end of the device.

FIGURE 8 is a sectional elevation taken substantially on the lines 8—8 as shown in FIGURE 7.

FIGURE 9 is a transverse sectional view taken substantially on the lines 9—9 as shown in FIGURE 7.

FIGURE 10 is a sectional view taken substantially on the curved line 10—10 as shown in FIGURE 9.

FIGURE 11 is a sectional detail taken substantially on the lines 11—11 as shown in FIGURE 7.

FIGURE 12 is a sectional elevation taken substantially on the lines 12—12 as shown in FIGURE 9.

FIGURE 13 is a side elevation partly in section, showing details of construction of certain of the parts shown in FIGURES 3 and 4.

FIGURE 14 is a side elevation taken substantially in the direction 14—14 as shown in FIGURE 13.

FIGURE 15 is a sectional side elevation taken substantially on the lines 15—15 as shown in FIGURE 14.

FIGURE 16 is a diagram showing control means for insuring equal travel of the two lifting rams for the die table.

FIGURE 17 is a plan view in diagrammatic form showing a modification.

FIGURE 18 is a sectional detail taken substantially on the lines 18—18 as viewed in FIGURE 17.

Referring to the drawings, the stationary frame generally designated 10 rests on a suitable foundation 11 and a major portion of the frame extends into a pit 12 below the level of the floor 13. The particular device illustrated in the drawings is designed for operation on rectangular sheets and hence, the device is provided with a plurality of end jaws 14 adapted to grip opposite ends of the sheet and a plurality of side clamps 15 arranged to clamp the side edges of the sheet. The sheet or workpiece is generally designated 16 and as clearly shown in FIGURE 5, comprises a flat metallic sheet provided with integral stiffeners 17 and integral ribs 18. The ribs extend along the side edges of the sheet 16. The method and apparatus of our invention makes it possible to change the shape of the sheet or workpiece 16 from the flat shape shown in FIGURE 5 to the curved contour shown in FIGURE 6.

The frame 10 includes a pair of longitudinally spaced vertical cylinder supports 19. These supports provide vertically spaced guides 20 and 21 for the posts 22. The posts 22 are parallel and are connected to the die table 23 at their upper ends. The lower ends of the posts 22 are contacted by pistons 24, slidably received within cylinders 25 and 26. Interengaging parts 27 are provided for securing the cylinders 26 to the supports 19 when hydraulic fluid is admitted through the conduit 28 into the sprace 29 and exhausted from space 30 through conduit 31. The piston 24 moves upward within the cylinder 26 and raises the vertical posts 22. Both posts move in unison to raise and lower the ide table 23 with respect to the frame 10. Means are provided as described below to insure equal travel of the posts 22.

A die 32 is secured to the die table 23 by conventional means (not shown) and the upper surface 33 of the die 32 is curved to produce the desired shape on the sheet 16. In the present case, the surface 33 forms part of a cylinder and is curved in transverse cross section as shown in the drawings. The die 32 is provided with longitudinal grooves 34 to provide clearance space for the stiffener fins 17 which project downward from the under surface of the sheet 16.

At each end of the frame 10 there is mounted a cross head 35 which moves on the die table 23. Parallel horizontal adjusting screws 37 and 38 are mounted to turn on the frame 10 and each cross head 35 is provided with nuts 39 engaging these adjusting screws. Rotation of the adjusting screws by means of the motor 40 and chain drive 41 serves to move the corresponding cross head 35 horizontally along die table 23.

Each of the two cross heads 35 supports tension cylinder assemblies 42. These assemblies are hydraulically actuated and have piston rods 43 which serve to move the jaw carrier 44 horizontally toward and away from the end of the sheet 16. Each carrier 44 is provided with a series of arcuate slots 45 and as shown in FIGURE 10 each of these slots has a narrow entrance 46 communicating with groove 47 of greater width. A T-shaped tongue 48 is slidably received in each of the arcuate slots 45 and each tongue is connected to a bracket 49 having a pair of parallel pivot pins 50. Parallel tension links 51 are connected to the pivot pins 50 and to similar pivot pins 52 mounted to support jaw blocks 53.

As shown in FIGURE 12, each jaw block 53 is provided with a forward opening cavity 54 adapted to receive wedge guides 55. The wedge guides 55 are held in position by means of a tongue and groove connection 56 and a plurality of threaded fasteners 57. Wedges 58 have a tongue and groove connection 59 with the wedge guides 55 and support the upper and lower jaw inserts 60 and 61. Each of these jaw inserts is held in place by means of a suitable threaded fastening and each is provided with a serrated surface to grip an end portion of the sheet 16 therebetween. The wedges 58 are moved relative to the wedge guides 55 by means of a power cylinder assembly generally designated 62. Each of these assemblies 62 includes a piston 63 mounted to slide within a cylindrical bore 64 having a piston rod 65 connected to an actuator flange 66. This flange is received within grooves 67 provided in the wedges 58. When hydraulic fluid is supplied through conduit 68 into space 69, the piston 63 and piston rod 65 are moved to the left as viewed in FIGURE 12 to cause the jaw inserts 60 and 61 to grip the sheet 16. Hydraulic fluid in space 70 is discharged through conduit 71. The gripping jaws are released when hydraulic fluid is supplied through conduit 71 and exhausted through conduit 68.

The jaw blocks 53 and the individual jaw inserts 60 and 61 are relatively narrow in width as shown in FIGURES 9 and 10 and hence a relatively large number are provided to grip substantially the entire length of the end of the sheet 16. The jaw inserts 61 are relieved where necessary to provide clearance around the integral stiffener fins 17 and ribs 18. A plate 72 rests on the die table 23 and this plate is threaded at intervals to receive a plurality of threaded elements 73 serving as limit stops. The upper end of each of these elements 73 supports one of the blocks 53 at the desired elevation. Clips 74 affixed to each block 53 by means of fastenings 75 are provided with curved surfaces 76 which engage the curved ends of the bracket 77 which carries the hinge segments 78 of the hinge pins 52 connecting these segments 78 to the forward end of the parallel tension links 51.

From this description it will be understood that each end jaw generally designated 14 and including the jaw blocks 53 and gripping parts 55, 58, 60 and 61 is independently supported and tilted to the desired angle and held in position by means of parallel tension links 51 extending from the jaw carrier 44. The end jaw assemblies 14 accordingly may be positioned to grip the sheet 16 when it is flat or when it is curved and the end jaw assemblies permit application of tension forces equally along the ends of the sheet 16. Moreover, the segmental tip end jaws 14 do not prevent lateral stretching of the sheet 16 at intervals between the jaw segments.

The frame 10 is provided with a series of longitudinally spaced upright supports 80 and between each pair of supports there is mounted a tilting carrier 81. Stub shafts 82 pivotally support each carrier 81 on the frame members 80. Each of the carriers 81 receives a pair of parallel bars 83 in sliding relationship and the axes of the bars 83 intersect the axes of the pivot shafts 82. As shown in FIGURE 13, each tilting carrier 81 is provided with spaced guides 84 and 84a which make sliding contact with the bars 83. The rear portion of each bar is externally threaded as shown at 85 and a stop nut 86 is mounted on this threaded portion of each bar. The stop nut is adapted to engage the abutment surface 87 provided on one end of the tiltable carrier 81.

The forward end of each of the bars 83 is releasably connected to a terminal fitting 88 by means of threaded fastenings 89. Each fitting 88 is in turn connected by threaded fastenings 90 to a clamp body 91. Each of these clamp bodies 91 is provided with a removable clamp element 92 held in place by a threaded fastening 93. This clamp element 92 is provided with a shoulder 94 adapted to slidably engage the side face of the integral rib 18 provided on the sheet 16.

Each clamp body 91 is pivotally connected at 95 to the cylinder member 96 of a power cylinder assembly generally designated 97. A piston rod 98 projecting from said assembly 97 is pivotally connected to the clamp link 99 by means of pivot pin 100. The clamp link 99 is also pivoted to the clamp body 91 by means of pivot pin 101. As best shown in FIGURE 15, the clamp link 99 carries a removable clamp rail 102 on its lower surface and this slidably engages the upper surface of the sheet at a location directly above the integral rib 18. The rib 18 is therefore slidably clamped between the rail 102 and the clamp insert element 92. When hydraulic fluid is supplied to the cylinder assembly 97 to extend the piston rod 98, the clamping link 99 is swung to operative position as shown in FIGURE 15. When the cylinder assembly 97 is operated to retract the piston rod 98, the clamping link 99 is swung to the inoperative position shown in phantom lines in FIGURE 15 and in the latter position the sheet 16 may be raised to disengage the integral rib 18 from the clamp element 92.

Means are provided for moving the bars 83 longitudinally through respective tilting carriers 81 and as shown in the drawings, this means includes a power cylinder assembly generally designated 104. This assembly 104 is mounted upon one of the tilting carriers 81 by means of pivot pins 105 and is provided with a piston rod 106 fixed to the clamp body 91. When the cylinder assembly 104 is actuated to extend the rod 106, the bar 83 is moved through the tilting carrier until the stop nut 86 engages the abutment 87. It is not necessary to provide a cylinder assembly 104 for each of the bars 83 since several of the bars are moved axially as a unit in the normal operation of the machine. Furthermore, the clamping rail 102 extends continuously between the clamping links 99 and thereby serves as a connection between the individual clamps 15. As a matter of convenience, we prefer to provide one cylinder assembly 104 for each four clamp units 15 and hence these may be advanced and retracted from operative position as a unit.

Means are provided for swinging the tilting carriers 81 about the axis of their pivot shafts 82 and as shown in the drawings, this means includes a plurality of inclined power cylinder assemblies 108, having extensible piston rods 109. Each cylinder assembly 108 is pivotally mounted at 110 on the frame and each piston rod 109 is pivotally connected at 111 to one of the tilting carriers 81. When the piston rod 109 is extended the tilting carriers and associated mechanism assume the horizontal position shown on the left side of FIGURE 3. When the hydraulic cylinder assemblies 108 are actuated to retract the piston rods 109, the corresponding tilting carriers 81 are swung into operative vertical position shown on the right side of FIGURE 3. In this position, adequate clearance along the side edges of the plate 16 is provided for manipulating the sheet and moving it into and out of position on the die 32.

The machine is capable of performing stretch wrap functions in several different modes of operation: (A) the sheet 16 may be held in the side clamps 15 and stretched over the die 32 by moving the end jaws 14; (B) the sheet may be held in the side clamps 15 and stretched by raising the die 32; (C) the sheet 16 may be held in the side clamps 15 and end jaws 14 and stretched biaxially by upward movement of the die 32.

In stretch forming the sheet 16 with the integral stiffeners 17, we prefer to use the first of these methods wherein the edges of the sheet 16 are slidably engaged by the clamps 15 and wherein tension forces are applied by the end jaws 14 after the die 32 has been moved upward from the position shown in FIGURE 3 to the position shown in FIGURE 4. The sheet 16 is lowered into position on the die 32 with the integral stiffener fins 17 received within the clearance slots 34 provided on the die 32. The side clamps 15 are then swung into position and the power cylinder assemblies 97 are actuated to clamp the integral ribs 18 between the clamp rail 102 and the clamp elements 92. The stop nuts 86 are adjusted to engage the abutments 87 with the ribs 18 abutting the shoulder 94 and thereby preventing lateral movement of the rectangular sheet 16. The die table 23 and die 32 are then raised by introducing hydraulic fluid through conduits 28 to cause the pistons 24 to lift the posts 22. The die 32 is raised until the under surface of the sheet 16 conforms to the contour of the upper surface 33 of the die 32. The sheet 16 is then in the position shown in FIGURE 4.

The end jaws 14 are then engaged with the opposite ends of the sheet 16. The individual jaw blocks 53 are adjusted to the position shown in FIGURE 9 closely to conform to the curved contour of the sheet 16. The adjusting screws 37 and 38 are then turned to move the cross head 35 and associated parts including end jaws 14 into sheet-gripping position. The ends of the sheet are gripped between the jaw elements 60 and 61 by actuation of the individual hydraulic power cylinder assemblies 62. Hydraulic actuation of the main tension cylinders 42 at opposite ends of the die table 23 then serves to apply tension forces to the ends of the sheet 16 through the end jaws 14. The stretching forces applied longitudinally are sufficiently great to exceed the yield point of the material of the sheet 16. Furthermore, reduction in width of the sheet under the longitudinal stresses imposed by the end jaws 14 is prevented by the clamps 15, and hence the sheet is subjected to longitudinal as well as lateral tension stresses. This biaxial stretching of the sheet produces excellent results in stretch forming the sheet to very close dimensional tolerances. It will be noted that the side clamps 15 prevent reduction in width of the sheet 16 but do not prevent longitudinal stretching movement of the sheet in the vicinity of the clamps 15 because of the sliding contact between the clamp elements and the integral ribs 18 on the side edges of the sheet 16. Moreover, the forces applied by the clamps 15 to the sheet 16 change angular direction as the sheet bends about the die 32 in a manner so that the forces are substantially tangential to the location of the contact between the sheet and the die. In this sense the lateral restraining forces applied to the sheet are tangent to the die.

Means are provided for insuring equal travel of the end jaws on opposite ends of the sheet 16. It is desirable that stretching movement of the sheet 16 relative to the die 32 be substantially equal on both ends. The sheet 16 does not travel bodily with respect to the frame and the sliding movement adjacent the clamps 15 is equalized on both ends of the machine. In order to secure substantially equal travel of the ends of the sheet 16, we provide travel control mechanism generally designated 115 mounted on the tension cylinders 42 at opposite ends of the die table 23. Each of these devices 115 includes a longitudinal screw 116 received in guide nuts 117 and 118 carried on the brackets 119 fixed to the cylinder assemblies 42. Electric limit switches 120, 121 are also fixed relative to the brackets 119 and have actuating elements adapted to be engaged by disks 122 and 123 respectively carried on the screw 116. An electric motor 124 is mounted on the jaw carrier 44 and drives through a reduction unit 125 to turn the screw 116. The nut 118 engages the screw 116 and acts through linkage 127 to move the valve control arm 128. A horizontal stem 129 extends through stuffing box 140 into the control valve assembly 141. The control valve assembly 141 is connected by means (not shown) to regulate the flow of hydraulic fluid into and out of the tension cylinder assemblies 42. When the rate of flow of hydraulic fluid into and out of the tension cylinders 42 is such as to cause movement of the hollow piston rods 43 at the same rate as movement of the non-rotary nut 118 along the rotating screw 116, the position of the linkage 127 does not change. However, if the rate of movement of the piston rods 43 should be too great, the arm 128 moves in a direction to cause the stem 129 to reduce the rate of delivery of hydraulic fluid into the tension cylinder assemblies 42. Conversely, if the rate of movement of the hollow piston rods 43 should be too small, the arm 128 moves the stem 129 in the other direction to increase the rate of flow of hydraulic fluid into the tension cylinders 42. Since the electric motors 124 are mounted at opposite ends of the sheet 16 the carriers 44 and the jaws 14 are driven at the same speed. The control valves 141 therefore admit proper quantities of hydraulic fluid to cause equal rates of movement of the hollow piston rods 43 on opposite ends of the machine.

It is necessary that the two posts 22 raise and lower at the same rate so that the die table 23 and die 32 remain horizontal. In order to insure equal movement of the posts 22, we provide an electric motor 150 which is mounted on the die table and which drives gear reducers 151, 152 through shafts 153 and chains 154. The motor 150 and gear reducers 151 and 152 are mounted on the die table. Each gear reducer turns a vertical screw 155, 156 and each screw is engaged by a non-rotary nut 157, 158. Nut 157 is pivotally connected to a lever 159 and this lever is pivotally mounted at 160 on arm 161. Similarly nut 158 is pivotally connected to lever 162 and this lever is pivoted at 163 on the arm 164. The arm 161 is fixed on the power cylinder assembly 25 and the arm 164 is fixed on the power cylinder assembly 26. Each lever 159, 162 acts through a pivot 165 and rod 166 to operate a control valve 167. This control valve is connected to regulate the flow of pressure fluid into the power cylinder assemblies 25 and 26 through conduits 28. When it is desired to raise the die table 23, the electric motor 150 is energized to turn the screws 155 and 156. The non-rotary nuts then serve to tilt the levers 159, 162 and cause the control valves 167 to admit hydraulic fluid into the lines 28 communicating with the lower ends of the hydraulic cylinder assemblies 25 and 26. When the rate of flow of hydraulic fluid into the hydraulic cylinder assemblies is such as to cause upward movement of the die table 23 at a rate equal to the relative longitudinal movement between the screws 155, 156 and the nuts 157, 158, the control system is balanced and the die table moves upward at the desired rate. If one of the posts 22 should move too slowly, the corresponding nut 157 or 158 acts through its respective lever to cause the associated control valve 167 to increase the rate of flow of hydraulic fluid. Lowering of the die table is accomplished by reversing the direction of rotation of the electric motor 150.

Our method of applying biaxial stretching forces to a sheet is not limited to the particular form of apparatus disclosed in the drawings nor is it limited to sheets which have integral ribs formed along the edges thereof. FIGURE 17 is a diagram showing another means of carrying out our method of biaxially stretching a sheet. As shown in FIGURE 17 a large number of small lugs 170 are individually clamped along edges of a sheet 16a. These lugs 170 may each employ wedges 171 for gripping the sheet 16a as shown in FIGURE 18. Each lug 170 is provided with abutment surfaces 172 and 173. Tension members 174 receive a plurality of lugs 170 within a cavity 175. The tension members 174 have shoulders 176 and 177 which engage the abutments 172 and 173 respectively on the lugs 170. The engagement permits sliding motion of the lugs 170 with respect to the member 174.

Longitudinal tension forces may be applied to the sheet 16a by means of jaws of the type previously described. The lugs 170 and associated tension members 174 prevent lateral sliding of the sheet 16a under the applied tension forces in the same general manner as outlined above.

Having fully described our invention, it is to be understood that we do not wish to be limited to the details herein set forth, but our invention is of the full scope of the appended claims.

We claim:

1. Apparatus for stretch-wrap forming of a metal sheet, comprising in combination: a stationary frame, a die table mounted on the frame for movement in a direction normal to the initial plane of the sheet, a die on the table movable into engagement with a surface of the sheet, a pair of opposed jaw assemblies movably mounted on the frame at opposite ends of the die table, each jaw assembly having a plurality of gripper elements engaging the sheet, power means for moving the jaw assemblies in opposite directions relative to the frame to impart tension forces to the sheet, and clamp means on the frame adapted to cooperate with the edge of the sheet to apply tangential forces to restrain inward movement thereof while permitting longitudinal stretching movement of the sheet along the entire length of the side edges, and means regulating the action of the power means to insure equal rates of movement of said jaw assemblies.

2. Apparatus for stretch-wrap forming of a metal sheet, comprising in combination: a stationary frame, a die table mounted on the frame for vertical movement, a die on the die table for engagement with the sheet, a pair of opposed jaw assemblies movably mounted on the frame at opposite ends of the die table, each of said assemblies including a cross-head slidably mounted for horizontal movement on the die table, means for adjusting the position of each cross-head with respect to the die table, each jaw assembly also having power cylinder means on one side of the cross-head connected to a plurality of gripper elements on the other side of the cross-head, the gripper elements having means for engaging end portions of the sheet, the power cylinder means of said opposed jaw assemblies being adapted for moving the gripper elements in opposite directions to impart tension forces to the sheet, and clamp means pivotally mounted on the frame adapted to cooperate with the side edges of the sheet to apply tangential forces to restrain inward movement thereof while permitting longitudinal stretching movement of the sheet.

3. Apparatus for stretch-wrap forming a rectangular metal sheet having parallel longitudinal stiffeners on one surface and having a rib along each side edge, comprising in combination: a frame, a pair of opposed jaw assemblies movably mounted on the frame engageable with opposite ends of the sheet, means for effecting relative movement of the jaw assemblies in opposite directions to impart longitudinal tension forces to the sheet, clamp means on the frame for slidably engaging the ribs on the sheet to apply tangential forces to restrain inward movement of the side edges of the sheet while permitting longitudinal sliding movement thereof, a movable die table mounted on the frame and supporting the opposed jaw assemblies, and a die on the table movable into engagement with a surface of the sheet, the die having clearance slots to receive the longitudinal stiffeners.

4. Apparatus for stretch-forming a rectangular metal sheet having rib elements provided along its side edges, comprising, in combination: a frame, a pair of longitudinal spaced opposed jaw assemblies movably mounted on said frame for engagement with opposite ends of the sheet, means for moving said jaw assemblies in opposite directions relative to said frame to impart longitudinal tension forces to the sheet, clamps pivotally mounted on the frame and slidably engaging said rib elements on the side edges of the sheet along substantially the entire length of the sheet to restrain transverse shrinking of the sheet under tension forces applied by said opposing jaw assemblies.

5. Apparatus for stretch-wrap forming of a rectangular metal sheet having rib elements provided along its side edges, comprising in combination: a frame, a die table, a pair of longitudinally spaced opposed jaw assemblies movably mounted on the frame for engagement with opposite ends of the sheet, means for moving said jaw assemblies in opposite directions relative to the frame to impart longitudinal tension forces to the sheet, clamps pivotally mounted on the frame slidably engaging said rib elements along substantially the entire length of the side edges of the sheet to restrain transverse shrinking of the sheet, said clamps having means for permitting longitudinal stretching movement of the side edges of the sheet, means mounting the die table on the frame for movement in a direction normal to the direction of movement of said jaw assemblies, and a die on the table movable into engagement with a surface of the sheet.

6. Apparatus for stretch forming a rectangular metal sheet having rib elements provided along its side edges, comprising in combination: a frame, a pair of longitudinally spaced opposed jaw assemblies movably mounted on the frame for engagement with opposite ends of the sheet, means for effecting relative movement of said jaw assemblies in opposite directions to impart longitudinal tension forces to the sheet, clamps pivotally mounted on the frame and slidably engaging said rib elements on the side edges of the sheet along substantially the entire length of the sheet to restrain transverse shrinking of the sheet under tension forces applied by said opposing jaw assemblies.

References Cited in the file of this patent

UNITED STATES PATENTS

| | | |
|---|---|---|
| 1,315,937 | Artz | Sept. 16, 1919 |
| 2,154,009 | Priest | Apr. 11, 1939 |
| 2,441,707 | Lermont | May 18, 1948 |
| 2,692,633 | Green | Oct. 26, 1954 |
| 2,716,806 | Reed | Sept. 6, 1955 |
| 2,741,834 | Reed | Apr. 17, 1956 |
| 2,767,767 | Peterson | Oct. 23, 1956 |
| 2,905,225 | Lalli | Sept. 22, 1959 |

FOREIGN PATENTS

| | | |
|---|---|---|
| 122,261 | Australia | Sept. 12, 1946 |
| 896,184 | Germany | Nov. 9, 1953 |
| 482,769 | Great Britain | Apr. 5, 1938 |